United States Patent [19]
Laub

[11] 3,952,148
[45] Apr. 20, 1976

[54] OPTICAL VIDEO DISC PLAYBACK SYSTEM WITH POSITION SERVO

[75] Inventor: Leonard J. Laub, Chicago, Ill.

[73] Assignee: Zenith Radio Corporation, Chicago, Ill.

[22] Filed: Mar. 13, 1974

[21] Appl. No.: 450,697

[52] U.S. Cl.............................. 178/6.6 R; 178/6.7 A; 179/100.3 V
[51] Int. Cl.² ........................ H04N 5/76; G11B 7/00
[58] Field of Search........... 179/100.3 V; 178/6.7 A, 178/6.6 R

[56] References Cited
UNITED STATES PATENTS

| | | | |
|---|---|---|---|
| 3,381,086 | 4/1968 | Moss | 179/100.3 V |
| 3,530,258 | 9/1970 | Gregg | 178/6.7 A |

*Primary Examiner*—Bernard Konick
*Assistant Examiner*—Alan Faber
*Attorney, Agent, or Firm*—John J. Pederson; Cornelius J. O'Connor

[57] ABSTRACT

An optical video disc playback system includes a feedback or servo arrangement through which radial beam tracking is maintained by controlled displacement of a mirror about a reference axis. The optical system which controls the reading beam is unique in that displacement of the mirror for tracking registration occasions no motion of the light pattern projected onto a photoreceptor employed for the development of a tracking correction signal and/or the program signal. By maintaining the photoreceptor at a distance from the record medium determined by the parameters of the final lens of the optical system, spurious error signals caused by record eccentricities are obviated.

Various optical systems are disclosed, both for achieving variations in the overall physical dimensions of the system and for accommodating displacement of the reading beam for timing corrections in addition to beam displacement for radial tracking correction.

18 Claims, 12 Drawing Figures

OPTICAL VIDEO DISC PLAYBACK SYSTEM WITH POSITION SERVO

SUMMARY OF THE INVENTION

The invention is directed to the structure of an optical video playback system and concerns, more particularly, an improvement in the optical system employed for focusing a reading beam on a video record and for responding to correction signals to maintain optimum relation of the beam to the disc during playback or reading of the video record.

optical image reproducing systems have been proposed as adjuncts to home color television receivers to increase their use by arranging for the playback of recorded program material through such receivers. Program is stored in a carrier, such as a disc quite similar to the familiar audio disc, to be read by a beam of energy, usually a laser beam, to develop an electrical signal representative of the stored information. The stored program may include luminance, chroma, audio and synchronizing components positioned in segments of the frequency spectrum convenient for disc recording but at the same time subject to transformation to the distribution that is typical of commerical broadcasts. Such broadcasts feature double interlaced fields for each picture frame, and in like fashion, the storage track of the video record generally takes the form of a multi-turn spiral with each convolution containing the two fields of an image frame with their synchronizing information.

Program information may be stored in optical discs in a variety of ways, including, in particular, formed grooves quite similar to audio recordings or a succession of concavities or pits alternating with a like succession of lands. While the invention is useful with either type recording, there presently is more interest in the use of pits and lands and, accordingly, the invention will be described in detail in that connection.

The pits and lands constituting the information storage track to be scanned or read by the reading beam have a uniform width but their length is variable along the track to the end that the pits and lands comprise a spatial representation of the temporal variations of an angular-velocity (frequency) modulated carrier signal which conveys the program material and controls the formation of the record track in a process of storing program information in the disc.

The stored information is easily retrieved by scanning the track with a reading beam and utilizing a photoreceptor to respond to that beam after it has read the track. Where the disc is transmissive to the reading beam, the photoreceptor is positioned along the beam path to collect a portion of the light transmitted through or scattered by the disc. Where the disc is reflective, the photoreceptor is located on the same side of the disc as the source of the reading beam to respond to light reflected from the storage track of the disc. In either case, the pits deflect or scatter light of the reading beam, causing the photoreceptor to develop an electrical signal modulated in accordance with the stored information.

Optical video systems perform satisfactorily, at least from a theoretical viewpoint, but in practice experience difficulty because of irregularities and eccentricities which are always encountered resulting in tracking misregistration of the reading beam or timing errors of the synchronizing information. Such irregularities are compensated by means of correction signals which reveal the sense and extent of the error so that mirrors included in the optical path may be displaced about their axes in response to such signals to achieve the necessary compensation. For radial tracking corrections the mirror deflects the reading beam in a radial direction whereas timing corrections require displacement of the beam tangentially of the storage track. Arrangements for effecting such displacements of the reading beam with the aid of mirrors properly disposed in the optical path are well known in the art. It has been found from experience, however, that past systems have the undesirable feature of causing some motion of the light pattern projected on the photoreceptor as the correcting mirrors are displaced. Any such motion may be likened to spurious information in the feedback system and may result in imperfections of the servo operation. Moreover, such motion may result in undesirable amplitude modulation and changes in frequency response.

Accordingly, it is a principal object of the invention to provide an optical video playback system which avoids or reduces undesirable features of the servo arrangements of the prior art.

It is a particular object of the invention to improve optical video playback systems so as to avoid positive feedback contributions attributable to movement of the projected light pattern in the detection plane with displacement of the correcting mirrors in the optical system.

It is a very particular object of the invention to arrange that such playback systems experience no motion of the projected light pattern in the plane of the photoreceptor as one or more compensating mirrors are adjusted to occasion selective displacement of the reading beam.

An optical video playback system, embodying the subject invention, comprises means for supporting a video record in a reading plane; frequently the record is a disc rotatably supported in the reading plane. There are means for developing a reading beam as well as an optical system for directing that beam along an optical path to the reading plane, that is, the surface of the video disc which includes the information storage track. Photoreceptor means are disposed in a detection plane extending across the continuation of the optical path taken by the reading beam after it has scanned a video record. The path extension may represent a linear travel of the beam through the disc in reading a transmissive disc or it may have an angular excursion in the plane of the disc as in operating in the reflective as distinguished from the transmissive mode. The optical system includes a mirror displaceable about a predetermined axis for selectively shifting the incident reading beam transversely of the path and further includes lens means between the mirror and the reading plane for focusing the beam after reflection by the mirror onto a video record supported in the reading plane and at the same time for imaging the mirror axis in the detection plane. The detection plane is so positioned relative to the location, focal length and magnification factor of the final lens means that the position of light pattern projected onto the photoreceptor means is substantially independent of the angular position of the mirror with respect to its axis.

BRIEF DESCRIPTION OF DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals and indicia identify like elements and in which:

While

DESCRIPTION OF PREFERRED EMBODIMENTS

Figure 1:
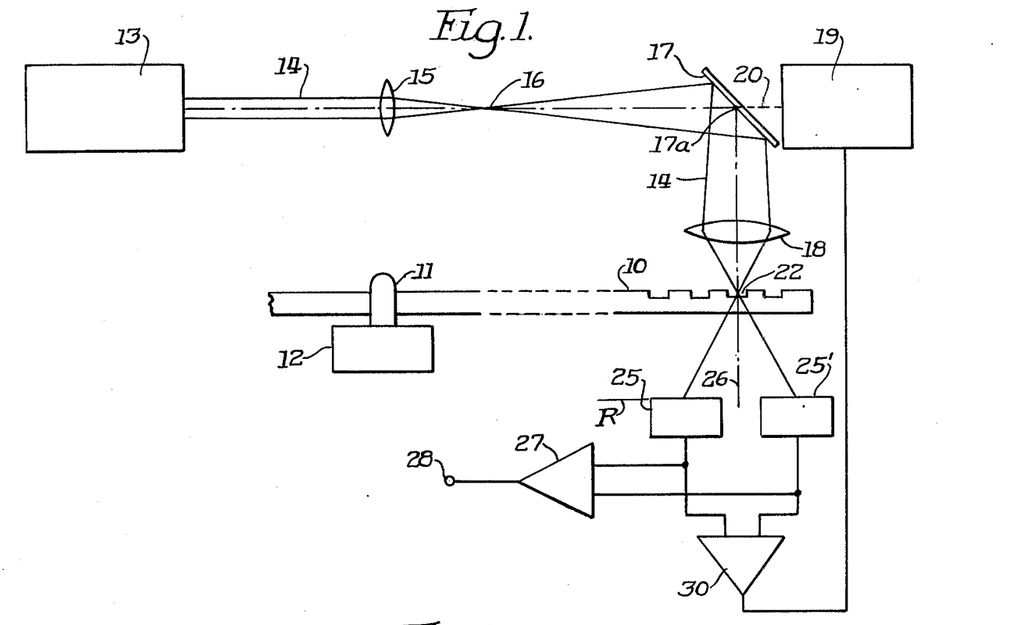
FIG. 1 is a schematic representation of an optical video playback system to which the invention has particular application.

Referring now more particularly to FIG. 1, the arrangement there represented is an optical playback system for reading a video record 10 formed of a material having the capability of storing information, such as polyvinyl chloride which may store information in a manner generally similar to an audio disc. The record most frequently is a circular disc which may be sufficiently thin, of the order of 4 to 8 mils, to be rotated at a high speed in a technique known as flying the disc for reading purposes. Alternatively, the disc may be sufficiently thick to be mechanically rigid in which case it is supported on a turntable (not shown) for rotation in a reading plane. The disc may be transmissive to the reading beam, and usually is when transcribed while it is flying, or it may be reflective particularly when supported on a turntable for playback. The disc has program information stored in the form of a continuous track which has a generally circular or spiral-shaped path and is made up of a series of pits and lands which alternate with one another along the path and collectively constitute the storage track. As thus far described, the disc is a known prior structure and may be dimensioned, particularly as to pit depth, in the manner described in a co-pending application, Ser. No. 439,680 filed Feb. 4, 1974, of Adrianus Korpel, assigned to the assignee of the present invention. The Korpel application, which is especially concerned with the depth dimension of the pits, explains the disadvantage of the prior practice of constructing the storage track with the prior practice of so-called half wave pits. This expression identifies discs in which a phase change of 180° or $\pi$ radians occurs between portions of the reading beam which impinge upon the pits and portions which impinge upon adjacent lands of a transmissive disc. Korpel teaches a preferred depth dimension wherein the phase change is $(n + \frac{1}{2}) \pi$ radians, where $n$ is zero or any integer. For the preferred case, $n$ is zero; it is sometimes referred to as a quarter wavelength pit. That, of course, is an attractive pit depth dimension for discs to be read by playback apparatus constructed in accordance with the invention although the invention is not limited to specific pit depths except that the half wave structure, without spot-wobble tracking or the like, is not appropriate. The half wave dimension is ruled out, as explained in the Korpel application, because it does not lend itself to a system having a photoreceptor detection means of the type to be utilized in the playback system of FIG. 1.

While the quarter wavelength pit is preferred, the next most attractive dimension is one in which the phase change is $3\pi/2$ or, the three-quarter wavelength pit. Discs of that dimension are accommodated very easily by the playback system although some modification is required simply because the sense of the correction or error signal obtained with such discs is opposite from that derived with quarter wave discs or grooved discs.

The means for supporting the video record or disc 10 in a reading plane is shown schematically as a spindle 11 which supports disc 10 for rotation by a motor 12. It is of no consequence, as indicated above, whether the disc rotating system includes a turntable (not shown) or not.

In order to read disc 10 the playback device includes means for developing a reading beam, here shown as a laser source 13 that develops and projects a collimated reading beam 14. The optical system for directing that beam along an optical path to the reading plane includes a lens 15 which focuses the beam to an intermediate spot 16 and further includes a mirror 17 and a final lens means 18 which focuses the beam to a final spot 22 in the reading plane. The mirror is displaceable about an axis 17A under the control of a driver 19 which is coupled thereto as indicated by broken-construction line 20. Displacement of mirror 17 about its axis shifts the reading beam 14 transversely of the optical path of the playback apparatus and the specific direction of displacement is determined by the correction intended to be accomplished through selective beam displacement. In the usual case of radial beam tracking, rotation of mirror 17 about its axis causes controlled beam displacement in either of two directions along a radial direction of disc 10 to maintain the beam properly centered on the storage track of the disc. On the other hand, for timing corrections, the beam displacement is along a tangential direction to achieve either an advance or retardation of the timing parameter. The advantages of the present invention are useful in either case and, indeed, are particularly beneficial in a more complex optical system that features both types of beam displacement for optimum disc playback. Illustrative optical systems for the more difficult application will be described hereafter.

Finally, the playback apparatus includes photoreceptor means disposed in a detection plane R that extends across the continuation of the path taken by the reading beam after scanning a record in the reading plane. For the specific embodiment under consideration the optical path extends linearly through the transmissive disc but, as stated above, undergoes an angular deflection in the plane of the disc in systems functioning in the reflective mode. For the transmissive mode, the photoreceptor is comprised of two photodiodes 25, 25' located in the far field, arranged in a common plane R and spaced symmetrically with respect to a reference plane 26 which is a plane normal to the larger plane of the disc, through the optical axis of the playback device and tangential to the record at the location of the reading beam. The signals from photodiodes 25, 25' are representative of the program information stored in the disc and their sum is delivered through a summing amplifier 27 to an output terminal 28. Amplifier 27 may include a suitable transcoder or the signal from terminal 28 may be applied to a color receiver through a transcoder which encodes the program signal as required for direct application to the antenna input terminals of a television receiver.

The difference of the signals from photodiodes 25, 25' may serve as a radial tracking correction signal that is applied through a differential amplifier 30 to unit 19 which drives mirror 17 about its axis 17a. A suitable mechanical structure for mirror 17 and its driver 19 is described and claimed in a co-pending application of Robert Adler et al Ser. No. 439,684, filed Feb. 4, 1974, now abandoned. It comprises a cantilever mounted piezoelectric bender or bimorph carrying a mirror on its free end. During operating intervals in which beam 14 is properly centered in the portion of the storage track being read, photocells 25, 25' receive equal energization; the correction signal has zero value and unit 19 retains mirror 17 in a reference position. Should the beam become decentered, whether that be attributable to a deficiency in the optical system or to the record, one of the photodetectors is more highly energized than the other. In that case there is a differential output from amplifier 30 with a polarity designating the sense of the misregistration and an amplitude related to the extent. Unit 19 responds to the correction signal and displaces mirror 17 in the appropriate direction and amount about axis 17a to displace or return the reading beam into proper tracking relation. As thus far described, this system antedates the present invention which concerns improvements to avoid undesired feedback components in the servo system comprised of photodiodes 25, 25', amplifier 30 and control unit 19.

Figure 2:
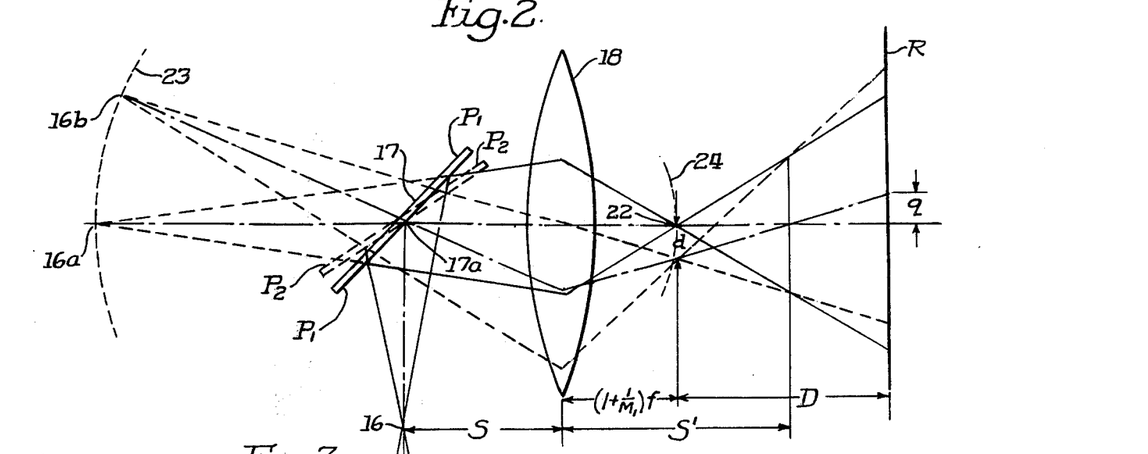
FIG. 2 is a diagram used in explaining certain properties of the optical system of video playback devices.

The operation of prior tracking servos, particularly with regard to spurious feedback, will be explained with relation to the diagram of FIG. 2 depicting the case in which mirror 17 is placed behind the final lens 18 as in the optical system of FIG. 1. When the mirror is in its reference position designated $P_1 - P_1$, a condition in which the reading beam is centered on the optical path and also centered on the storage track of video disc 10, the intermediate spot 16 may be thought of as positioned on the optical axis at a point determined by looking backwardly from lens 18 through mirror 17 and along that axis. The position is designated 16a. Assume now that the mirror is shifted about its axis 17a to a new position $P_2 - P_2$, displacing the final focused beam spot 22 a distance d off the optical axis in the reading plane, that is to say, the plane of disc 10. Unless the optical system satisfies conditions to be explained hereafter, such displacement of final spot 22 occasions a shift q of the light pattern projected in the detection plane R. The amount of displacement q of the light pattern is given by the following:

$$q = d\left[1 + \frac{D}{(1+M_1)f_1 - S'}\right] \qquad (1),$$

where D is the distance from the final spot focus of the reading beam to the detection plane R of photoreceptor 25, 25', $M_1$ and $f_1$ are the magnification factor and focal length, respectively, of final lens 18 and S' is the distance from the lens to the image of the axis of mirror 17. The central ray of the reading beam goes through axis 17a of mirror 17 and therefore it also always goes through the image of the mirror axis. For optical systems in which the plane of detection R is behind that image, or a condition in which $$\left[D > S' - f_1\left(1 + \frac{1}{M_1}\right)\right] \qquad (2),$$

the projected light image in the detection plane is displaced in the opposite direction to the displacement of the final spot as illustrated in FIG. 2. This gives rise to a component of positive feedback in the servo system. On the other hand, when the plane of detection lies before that image, or a condition in which $$\left[D < S' - f_1\left(1 + \frac{1}{M_1}\right)\right] \qquad (3),$$

the two displacements d and q are in the same sense and therefore the feedback contribution is negative. It should be observed that the sense of feedback is a function of pit depth, as explained above. The conditions to which expressions (2) and (3) apply are those of the quarter wave or grooved disc. For the three-quarter wavelength pit, expression (2) changes to less than (<) rather than greater than (>) and a similar change is required for expression (3), changing less than (<) to greater than (>). The positive feedback case is most undesirable since it introduces an unbalance in the system leading to instability and causing mirror 17 to be displaced to one extreme position about its axis 17a. The negative feedback condition on the other hand has the effect of increasing the stiffness of the transducer and can be tolerated but in the ideal case the feedback contribution attributable to shift in the projected light pattern in detection plane R is zero. The desired condition may be alternatively described as one in which the projected light pattern remains fixed in the detection plane while the reading spot is moved radially in the absence of a disc in the reading plane. In other words, unbalance of light between photodiodes 25, 25' is only a function of decentering of reading spot 22 relative to the information storage track of disc 10. The desired result is achieved in accordance with the present invention by dimensioning the optical system to the end that axis 17a of mirror 17 is imaged in the plane of detection R. That may be realized in practice by proper dimensioning of the optical system and appropriate selection of focal length of final lens 18.

If the detection plane R is fixed, mirror 17 is placed a distance S behind the final lens such that:

$$S = f_1\left[1 + \frac{f_1}{D + f_1/M_1}\right] \qquad (4),$$

It should be noted that the distances S and S', illustrated in FIG. 2 for example, are measured with respect to the principal planes of the final lens. If the mirror position is fixed, the detection plane is established at a distance D such that:

$$D = f_1\left[\frac{f_1}{S - f_1} - \frac{1}{M_1}\right] \qquad (5),$$

When the optical system is dimensioned in accordance with the appropriate one of equations (4) and (5), spurious feedback in the tracking servo system is avoided.

Another practical problem experienced with video playback devices of the type under consideration will be understood from the apparent position of intermediate spot 16b in FIG. 2 for the case in which mirror 17 has been displaced to the position $P_2 - p_2$. The two positions 16a and 16b of the apparent location of the intermediate spot, for the two illustrated positions of mirror 17, fall along an arcuate path 23 which has a radius essentially equal to the distance from intermediate spot 16 to mirror axis 17a. This may be used to advantage in compensating the curvature of field that lenses, such as final lens 18, frequently exhibit. Its effect is such that a plane imaged by such a lens is most sharply imaged on a curved surface 24 which approaches lens 18 for points off the optical axis. These surfaces 23 and 24 may be arranged to compensate one onother. More specifically since the curvature 23 is subject to control by adjusting the distance of intermediate spot 16 to axis 17a, the described system may compensate the field curvature of lens 18 at the same time that it avoids displacement of the projected light image in detection plane R. The condition to be satisfied is:

$$R_{23} = M_1^2 R_{24}$$

where $R_{23}$ and $R_{24}$ are the radius of curvature of surfaces 23 and 24, respectively, and $M_1$ is the magnification factor of lens 18.

Figure 3:
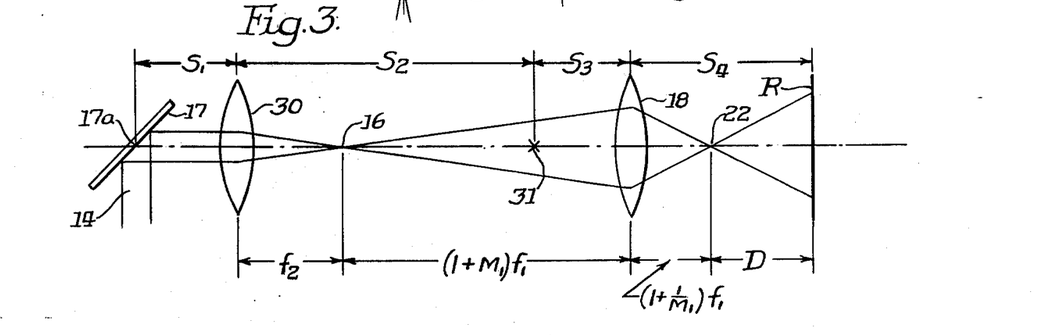
FIGS. 3–10, inclusive, represent various optical systems that may be utilized in practicing the invention.

It, of course, is not necessary that mirror 17 be immediately behind final lens 18. Another option available is to place the mirror behind an intermediate lens in the optical path arranged so that lens may cast an image of the mirror at an appropriate place along the optical path in order that, in turn, it is imaged in the detection plane. An arrangement of this type is shown in FIG. 3 wherein a positive intermediate lens 30 casts an image of mirror axis 17a at a point 31 on the optical path for final imaging by lens 18 in the detection plane R. This approach is advantageous when it is desirable to have the detection plane far from the disc.

If the position of detection plane R is fixed then mirror 17 must be spaced a distance $S_1$ behind intermediate lens 30 in accordance with the following:

$$S_1 = f_2 \left[ 1 + \frac{f_1}{M_1^2 D} + \frac{f_2}{M_1 f_1} \right] \quad (6),$$

where $f_2$ is the focal length of the intermediate lens. However, if the mirror position is fixed, then the detection plane should be spaced in accordance with:

$$D = \left[ \frac{1}{\frac{M_1^2 S_1}{f_2^2} - \frac{M_1^2}{f_2} - \frac{M_1}{f_1}} \right] \quad (7),$$

Figure 4:
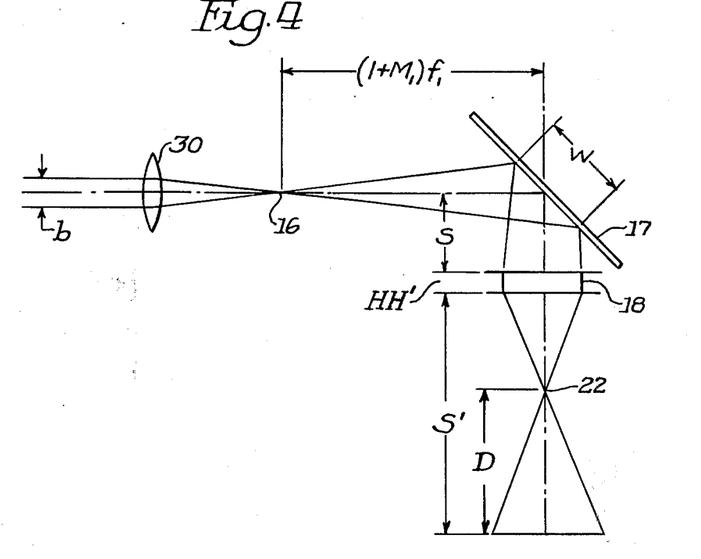
Figure 5:
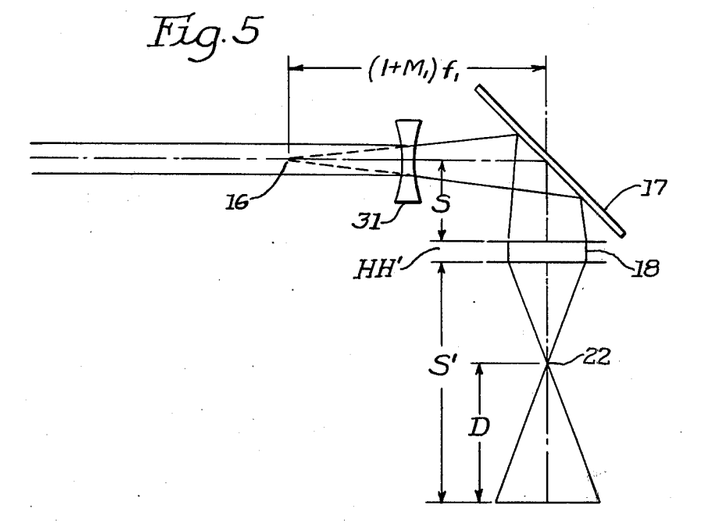

The mirror may, if desired, be located between the intermediate and final lenses. In FIG. 4 a positive intermediate lens 30 is employed whereas in FIG. 5 intermediate lens 31 is negative. In each figure the convention of two parallel lines with the designation H-H' is employed to show the principal planes of the final lens 18 and the dimensions are made with respect to those planes as indicated in the drawing. In arriving at the dimensions, equations (4) and (5) may be used depending on whether the detection plane or the mirror location is the fixed reference.

Figure 6:
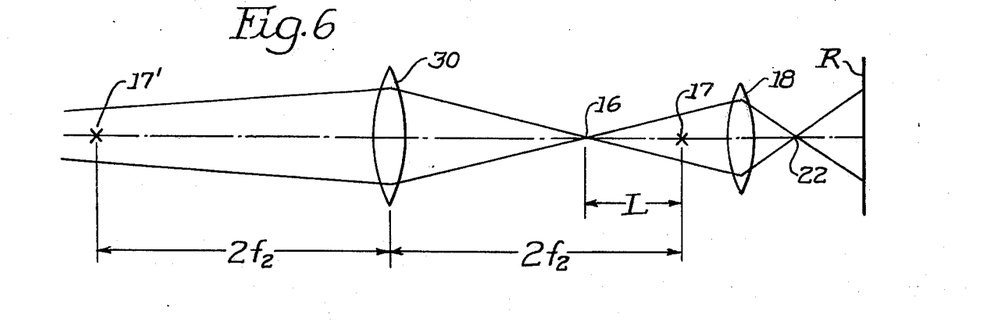

Any of the systems described thus far is useful for a video playback arrangement whether the displaceable mirror 17 is included in a servo arrangement for radial tracking or for timing correction. It has been found in practice that essentially the same total spot deflection should be provided for either correction and the remaining embodiments are directed to systems that provide two similar displaceable mirrors having similar optical lever arms for deflection in orthogonal axes as required for both corrections. Preferably, the mirrors are located in planes of the optical system where the light beam has a large cross section so that the high resolution required to produce large deflection of a small spot may be achieved with a limited angular swing of practical mirror transducer structures. The teachings of the present invention, as applied to a two mirror system, require that one mirror be imaged on the other and that the latter be imaged in the detection plane in the manner of the single mirror systems previously discussed. An illustrative arrangement is shown in FIG. 6 which includes a second mirror 17'. In this case intermediate lens 30 performs a dual role in that it forms the reading beam into the intermediate spot 16 and concurrently images mirror 17' upon mirror 17. In order to realize equal spot motion for the same angular displacement of both mirrors about their respective axes (not shown), the imaging of one on the other is accomplished at unity magnification, leading to equal sensitivity for both correction systems and also equal resolution. As indicated in FIG. 6, the easiest implementation is the use of a positive intermediate lens with each mirror separated therefrom by twice the focal length $f_2$ of that lens. The position of mirror 17 is determined by the requirement that it be imaged onto photodetection plane R and the intermediate spot 16 must occur in a place that permits the final lens to function properly. In other words, the distance L from intermediate spot 16 to mirror 17 is a distance that is to be preserved even though various changes may otherwise be made to the optical systems to satisfy the requirements of particular installations, including overall length.

Figure 7:
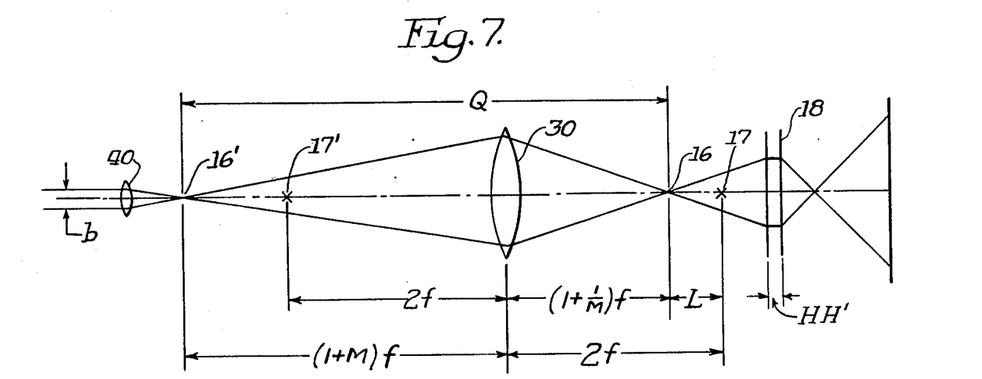

As a ractical matter the reading beam directly from the laser is too small to feed intermediate lens 30 and the addition of another lens 40, as shown in FIG. 7, will establish another intermediate spot 16' properly located with respect to (ahead of) mirror 17' and also feeding intermediate lens 30 with a beam of large cross section. It may be shown that this system may be arranged with a magnification factor of 3 and a focal length of three halves L for lens 30, giving a minimum distance Q between intermediate spots 16 and 16' equal to 8L, indicating the increased minimum length of this system over the single-mirror systems.

Figure 8:
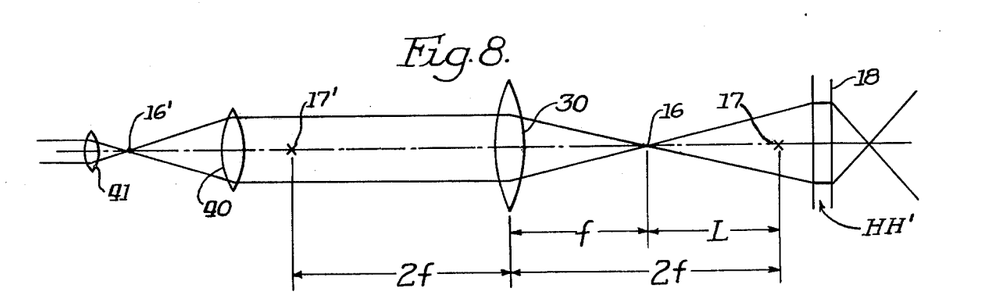

Still another lens 41 may be added to constitute with lens 40 a telescope focused at infinity. As shown in FIG. 8, the beam is then collimated as delivered to intermediate lens 30. The focal length of lens 30 is two-thirds that of the arrangement of FIG. 7 and it may be shown that the excess length of this system, over the one-mirror system, is reduced to 5 0r 6 L.

Figure 9:
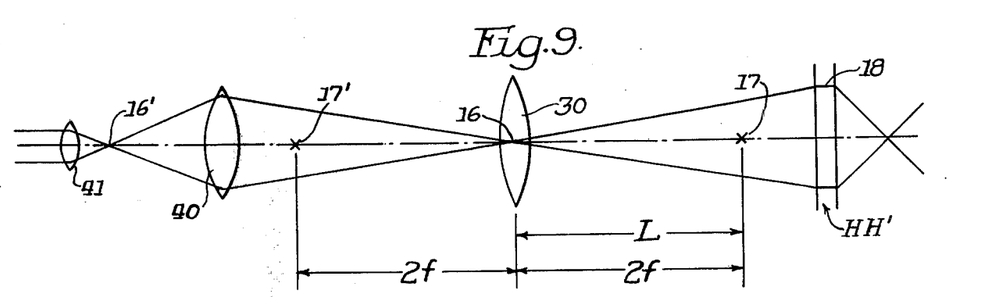

Refocusing the telescope permits moving the intermediate spot along the optical axis and, in the manner illustrated in FIG. 9, may form the intermediate spot 16 within intermediate lens 30 in which event lens 30 has no focusing effect on the spot whatever; its sole function is that of a field lens. Since the spot falls within the lens, the focal length reduces to L/2 and the length excess over the one-mirror system is no greater than 2 L. In this arrangement both mirrors 17 and 17' receive the reading beam with the same cross section and with the same curvature and, therefore, they function under very similar conditions. Since intermediate lens 30 has no focusing effect, it may be a cylinder lens with power only in the plane of action of the first mirror.

Figure 10:
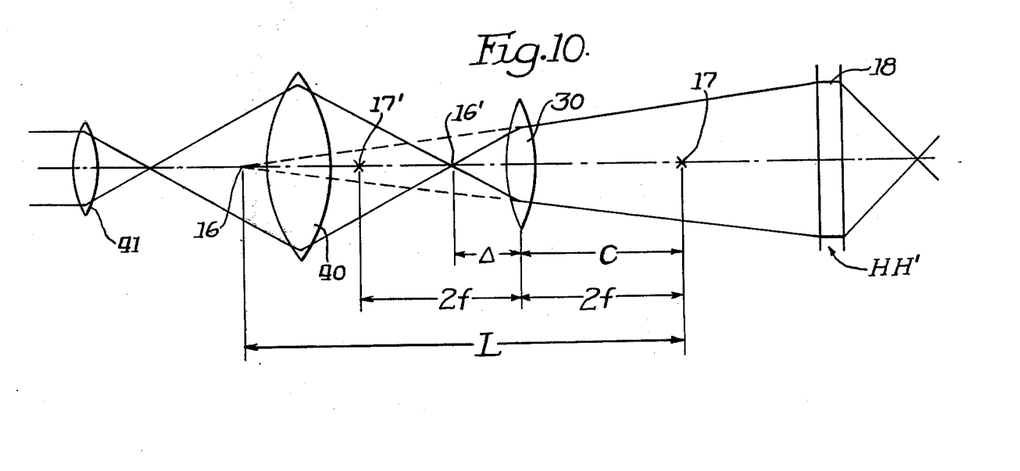

Still further refocusing of the telescope 40, 41 causes the intermediate spot 16 formed by the telescope to occur to the left of intermediate lens 30, as illustrated in FIG. 10. The intermediate spot 16 seen by final lens 18 is a virtual image of the spot formed by the telescope as indicated by the broken-construction lines and may be placed anywhere between infinity on the left and the intermediate lens itself by varying the distance $\Delta$ separating the real spot 16' and the intermediate lens 30 between zero and one focal length of that lens. This in effect moves final lens 18 and its mirror 17 toward intermediate lens 30 until the minimum separation for physical clearance (dimension C in FIG. 10) or free displacement of mirror 17 has been reached. By appropriate focusing of the telescope, the virtual intermediate spot 16 is established at the required distance L behind mirror 17 and the focal length of intermediate lens 30 falls to C/2 and is less than the distance L. This arrangement may have no length excess over the one-mirror system and may even be shorter but it does require two additional short, high aperture lenses, at least one of which, lens 30, must cover a considerable field.

Figure 11A:
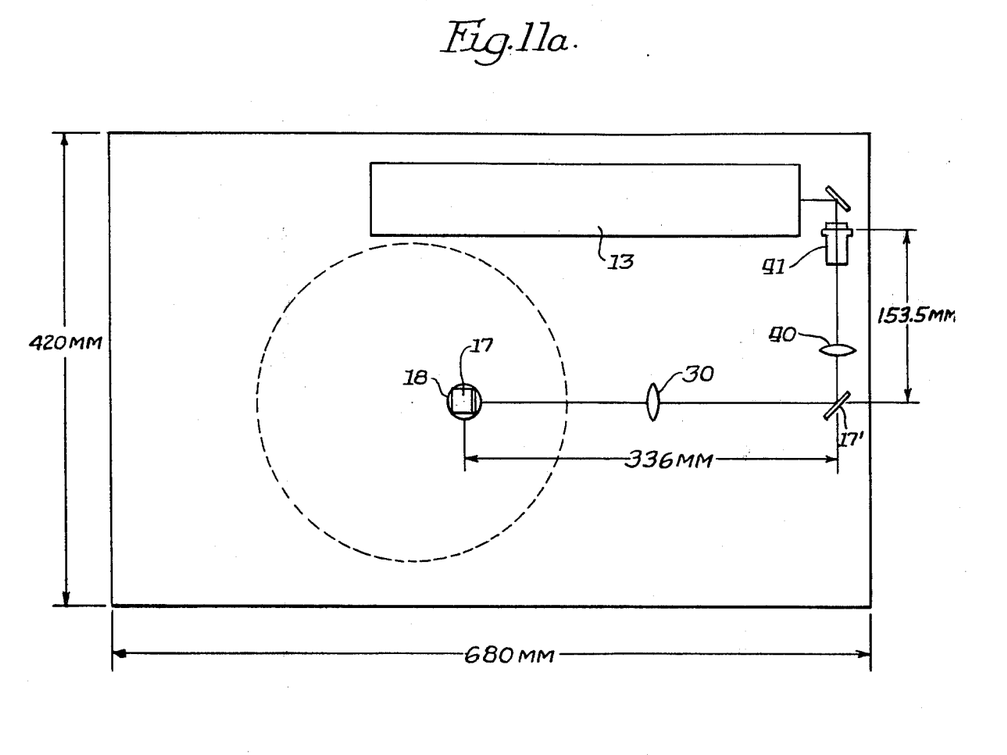
FIG. 11a is a plan or layout of a video playback system in accordance with the invention.
Figure 11B:
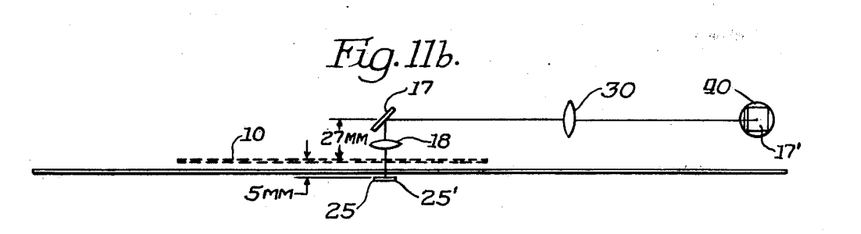
FIG. 11b is an elevational layout of that system.

In order to utilize any of the described systems, especially those employing two displaceable mirrors, it is usually required that the optical system be folded to have a compact playback device. FIG. 11a shows in plan view one such folded installation with dimensions that are found to be effective. Other dimensions are recorded in the elevational view of FIG. 11b. By way of illustration, and not limitation, that system followed these specifications:

laser beam $TEM_{oo}$, diameter 0.8 mm
lens 41: focal length 7.0 mm (25× microscope objective)
distance from first spot to lens 40— 65.5 mm
lens 40: focal length 50 mm, aperture > 7.5 mm (50 mm cine lens, faster than f/5.6)
distance from lens 40 to mirror 17' — 43. mm
distance from mirror 17' to lens 30 — 168 mm
lens 30: focal length 84 mm (single element, equiconvex),
aperture >6.25 mm
distance from lens 30 to mirror 17 —168 mm
distance from mirror 17 to lens 18 —16.8 mm
lens 18: 25.4× microscope objective, NA = 0.45
distance from lens 30 to final spot — 195 mm
distance from final spot to detection plane — 5 mm
working diameter of mirrors 17 and 17' >8.4 mm While particular embodiments of the present invention have been shown and described, it will be obvious to those skilled in the art that various changes and modifications may be made without departing from the invention in its broader aspects. Accordingly, the aim in the appended claims is to cover all such changes and modifications that may fall within the true spirit and scope of the invention.

what is claimed is:

1. An optical video playback system for deriving an output signal from a video record disc having information stored in a generally circular track, which system comprises:

means for supporting and rotating said record disc in a reading plane;
   means for developing an optical reading beam;
   an optical system for directing said reading beam along an optical path to said reading plane, said optical system including a mirror displaceable about a predetermined axis for selectively shifting said beam transversely of said path and further including a final lens means between said mirror and said reading plane for focusing said reading beam after reflection by said mirror onto said video disc and for imaging said mirror axis in a predetermined plane that extends across the continuation of said optical path taken by said reading beam after scanning said record disc and spaced from said reading plane by a distance $$S' - f \left(1 + \frac{1}{M}\right),$$

where S' is the distance from said final lens means to said image of the mirror axis, M is the magnification factor of said final lens means, and $f$ is the focal length of said final lens means;
   photoreceptor means disposed in said predetermined plane for developing a correction signal representing misregistration of said reading beam with respect to said track in responses to variations in the light distribution in said predetermined plane;
   and means responsive to said correction signal for displacing said mirror about its axis to maintain tracking registration of said reading beam with said track, without varying the position of the light pattern projected onto said photoreceptor means, whereby generation of spurious components in said correction signal due to record disc eccentricities and imperfections is substantially precluded.

2. An optical video playback system in accordance with claim 1 including an intermediate lens means in said optical path between said mirror and said final lens means for imaging said mirror axis at an appropriate location in said optical path for imaging by said final lens means.

3. An optical video playback system in accordance with claim 2 in which the distance $S_1$ of said mirror to said intermediate lens means is equal to:

$$f_2 \left[1 + \frac{f_2}{M_1^2 D} + \frac{f_2}{M_1 f_1}\right],$$

where $f_2$ and $f_2$ are at focal lengths of said final lens and said intermediate lens means, respectively, $M_1$ is the magnification factor of said final lens means, and D is the distance of said detection plane from said reading plane.

4. An optical video playback system in accordance with claim 2 in which the distance D of said detection plane from said reading beam is equal to:

$$\left[\frac{1}{\frac{M_1^2 S_1}{f_2^2} - \frac{M_1^2}{f_2} - \frac{M_1}{f_1}}\right],$$

where $f_1$ and $f_2$ are the focal lengths of said final and said intermediate lens means, respectively, $M_1$ is the magnification factor of said final lens means and $S_1$ is the distance of said mirror to said intermediate lens means.

5. An optical video playback system in accordance with claim 1 including a second mirror disposed in said optical path ahead of said first mirror and displaceable about a second predetermined axis and further including a positive intermediate lens means disposed in said path between said mirrors for focusing said beam into an intermediate spot ahead of said first mirror and also for focusing said second mirror onto said first mirror.

6. An optical video playback system in accordance with claim 5 in which said intermediate lens means focuses said second mirror onto said first mirror with unity magnification.

7. An optical video playback system in accordance with claim 5 in which said mirrors are both spaced from said intermediate lens means by a distance of twice the focal length of said intermediate lens means.

8. An optical video playback system in accordance with claim 7 including a third lens in said optical path for focusing said beam into an intermediate spot ahead of said second mirror.

9. An optical video playback system in accordance with claim 8 in which said intermediate lens means has a magnification factor of 3 and a focal length of 3/2 L, where L is the distance of said first mirror to the immediately adjacent one of said intermediate spots.

10. An optical video playback system in accordance with claim 8 including a fourth lens in said optical path ahead of said optical path ahead of said third lens and constituting therewith a telescope focused at infinity.

11. An optical video playback system in accordance with claim 8 including a fourth lens in said optical path ahead of said third lens and constituting therewith a telescope of such focus as to form said beam into an intermediate spot located within said intermediate lens means.

12. An optical video playback system in accordance with claim 10 including a fourth lens in said optical path ahead of said third lens and constituting therewith a telescope of such focus as to form said reading beam into an intermediate spot at a point in said optical path ahead of said intermediate lens means.

13. an optical video playback system in accordance with claim 12 in which said first mirror is positioned in said optical path substantially as close as possible to said intermediate lens means while permitting free displacement of said first mirror about said first axis.

14. An optical video playback system in accordance with claim 12 in which the focus of said telescope results in a virtual intermediate spot located in said optical path ahead of said second mirror.

15. An optical video playback system in accordance with claim 12 in which the focus of said telescope results in focusing said beam into an intermediate spot in said optical path ahead of said intermediate lens means by a distance substantially equal to the focal length of said intermediate lens means.

16. An optical video playback system in accordance with claim 1 including an intermediate lens means in said optical path for focusing said beam to an intermediate spot ahead of said mirror by a distance equal to $(1 + M_1)f_1$, where $M_1$ and $f_1$ are the magnification factor and focal length, respectively, of said final lens means, and in which the distance S of said mirror to said final lens means is substantially equal to:

$$f_1 \left[ 1 + \frac{f_1}{D + f_1/M_1} \right]$$

where D is the distance of said detection plane from said reading plane.

17. An optical video playback system in accordance with claim 1 including an intermediate lens means in said optical path for focusing said beam to an intermediate spot ahead of the location of said mirror by a distance $(1 + M_1)f_1$, where $M_1$ and $f_1$ are the magnification factor and focal length, respectively, of said final lens means, and in which the distance D of said detection plane form said reading plane is substantially equal to:

$$f_1 \left[ \frac{f_1}{S - f_1} - \frac{1}{M_1} \right]$$

where S is the distance of said mirror from said final lens means.

18. An optical video playback system in accordance with claim 1 in which said final lens means exhibits a field curvature of the type in which a plane is imaged onto a curved surface approaching said lens means for points off said optical axis and including an intermediate lens means for focusing said beam into an intermediate spot along said path ahead of said mirror by such a distance that displacement of said mirror about said axis causes said intermediate spot to traverse an arc of such radius as to compensate, at least in part, said field curvature of said final lens means.

* * * * *